United States Patent Office 3,067,077
Patented Dec. 4, 1962

3,067,077
DECORATIVE OVERLAY SHEETS AND ARTICLES CONTAINING SAME PREPARED FROM MODIFIED THERMOSETTING MELAMINE-FORMALDEHYDE RESINOUS COMPOSITIONS
Dominick M. Latella, Port Chester, N.Y., and Ivor H. Updegraff, Stamford, Conn., assignors to American Cyanamid Company, New York, N.Y., a corporation of Maine
No Drawing. Filed Dec. 24, 1958, Ser. No. 782,685
15 Claims. (Cl. 154—43)

This invention relates to resinous compositions useful in the decorative molding art and to the process for applying same. More particularly, this invention relates to soluble thermosetting resinous compositions comprising a combination of an amino-aldehyde resin and hydrolyzed polyvinyl acetate particularly adapted to impregnate absorbent fibrous overlays for use in the decorative molding field. In narrower aspects, this present invention concerns stable, dry, single-package resin systems consisting essentially of a thermosetting melamine-formaldehyde condensate, a polyvinyl alcohol, hexamethylenetetramine, and a curing catalyst for said condensate, which systems are readily soluble in essentially aqueous solvent systems.

It is an object of this invention to provide resinous compositions which permit the preparation of improved decorative, laminated, and other molded articles.

Another object of this invention is to provide resinous compositions and a method for treating decorative overlays therewith so as to render the overlays more suitable for printing operations.

A further object of this present invention is the production of ready-to-use, dry, resinous systems uniquely useful for treating decorative overlays in aminoplast molding applications.

The detailed discussion and examples presented hereinbelow will serve to illustrate more completely these and other objects of this invention.

The molding applications to which this invention is directed involve the preparation of essentially two distinct types of decorative, resin-based structures. One of such structures includes laminated articles primarily intended to be used as horizontal or working surfaces, e.g., table, counter or bar tops. The other type of structure includes reinforced, non-laminated molded articles which are particularly exemplified by dinnerware fabrications.

The conventional high-pressure laminates especially useful in horizontal surface structures, such as table tops, are usually composed of a laminated core, a print sheet and an overlay sheet. In such a laminated article, the core is conventionally composed of a plurality of kraft paper plies, which have been impregnated with a phenolic resin, assembled, and consolidated under heat and pressures. The function of the core is to impart rigidity to the laminated structure. In so far as this part of the laminate cannot be seen and additionally since this part is not subjected to abrasive conditions, the core is customarily fabricated from relatively inexpensive materials. Suitable core stock members are prepared using a low-cost kraft paper and the least amount of a low cost phenolic resin capable of providing a good bond for the core assembly.

A so-called print sheet supplies the decorative effect associated with the laminate, and in preparing the assembly for lamination, it is placed on top of the sheets constituting the core. The print sheet generally consists of a pure grade of an absorbent regenerated cellulose paper which has been printed with a design or dyed or pigmented to impart a solid color thereto. The printed designs have unlimited range of form or artistic effect so long as the inks that are used are non-bleeding in the resin solution. The print sheet also serves as a barrier sheet for the core stock assembly, thus masking the unattractive appearance of the core stock and additionally barring any bleeding or migration of the phenolic impregnant that otherwise might be apparent on the decorative surface of the laminate. The print sheet is required to have good appearance and durability. These properties are conventionally achieved by impregnating the print sheet with a melamine-formaldehyde resin, although formaldehyde condensates of other amino triazines may be used. Such a type resin is excellently constituted to impart hardness, abrasion resistance, solvent resistance and color-stability to the print sheet.

Because of the excessive wear to which horizontal working surfaces are generally subjected, it is conventional practice to lend greater durability to the aforesaid laminate assembly by applying an overlay sheet over the print sheet. The overlay sheet, often times called the decorative overlay, usually consists of a single sheet of paper, generally a very high grade of alpha cellulose paper, treated with an amino triazine resin corresponding essentially to that used to impregnate the print sheet. The primary objective in the use of the overlay sheet is to impart durability to the print sheet without detracting from its appearance. The amino triazine resins and specifically melamine resins have been widely used as impregnants for the overlay sheet because of their aforementioned desirable properties and, when thus employed, are present therein in a very substantial amount. The resin content of the overlay sheet is customarily about 60 to 70% of the weight of the treated sheet as compared with a conventional resin content of about 50% in the print sheet and a resin content of about 33 to 35% in the core sheet. Although the overlay sheet is relatively thin, i.e., 3–4 mils, and although the refractive index of alpha-cellulose is relatively close to that of the resinous impregnant, nevertheless the clarity of print design is rendered perceptibly hazy by its presence.

An attempt has been made along the lines of printing the underside of the overlay sheet rather than applying the design to the print sheet. In this manner an interfacial condition is eliminated and consequently the design shows up somewhat more distinctly than if it were associated with the print sheet. However, one serious disadvantage with this method is that it is difficult to uniformly print an impregnated overlay. It is in regard to this aspect relating to the preparation of decorative laminates that our discovery is particularly useful. We have found that if the overlay is impregnated or treated with our resinous compositions, then the poor printing qualities of the conventionally treated overlay paper are largely obviated. The compositions of this invention which are capable of overcoming the disadvantages mentioned will be discussed hereinbelow.

The other type of molding application in which our invention may be beneficially employed concerns the preparation of non-laminated molded structures such as dinnerware articles. The basic ingredients from which these molded articles are prepared comprise a filler or reinforcer, preferably a fibrous type, and a resinous binder. The resinous binder of high quality decorative moldings usually consists of an amino triazine-formaldehyde condensate.

In preparing molding compositions for use in fabricating decorative molded objects, a conventional method consists of impregnating the fibrous filler with an aqueous syrup of the thermosetting resin. Many types of material satisfactorily serve as fillers in compositions of this type. Among a few that may be mentioned are such as alpha cellulose, fibrous asbestos, fiberglass, yarn cuttings, and a variety of cloth cuttings (e.g. silk, rayon, linen, cotton, nylon or cloth made from glass fibers or from polymeric or copolymeric acrylonitrile fibers, etc.) and the like. Alpha cellulose is undoubtedly the most widely used filler. Alpha cellulose is generally received in sheet form. It may be cut prior to the impregnation step or it may be charged as is to the mixer. After the cellulosic filler has been suitably impregnated it is then dried to a volatile content of approximately 6%. The impregnated material leaves the dryer in a coarse granular state. It is conventional practice to mill and blend the coarse granular with components called additives in a ball mill. The additives include colorants to provide the desired decorative color to the composition, a curing catalyst for the thermosetting resinous condensate and a mold lubricant. Following the milling and blending operation, the molding composition is densified and then finally granulated.

In preparing decorative molded articles wherein decorative overlays are utilized, it is the usual commercial practice to shape the granular molding composition into a pre-formed article approximately corresponding to the shape of the article will assume in its final molded state. Shaping of the pre-form may be accomplished in a special pre-form or molding press or in a conventional molding press. The resin content of the pre-formed article may be either uncured or partially cured, however, it is important that the resinous material remains fusible and not completely cured or otherwise the subsequent application of the decorative overlay cannot be realized. A pre-formed article is of a somewhat porous nature and contains slightly more resinous material than will be retained in the final article in order to insure that the mold in the final molding operation will be completely filled, with the usual provision for a small amount of flashing. Accordingly, while these pre-forms correspond approximately to the contours of the final article, they are usually slightly larger or slightly thicker or both than the final article.

The overlay sheets employed to prepare decorative molded articles are generally of the same type as used in producing the high-pressure laminates described above. Accordingly, they are conventionally high grade alpha cellulose papers of a thickness of about 3–4 mils. The overlay sheet is impregnated with a heat reactive amino triazine-formaldehyde resin corresponding to the type used in the pre-forms, dried and partially cured. The resin content of the overlay sheet ranges from about 60–70% of the weight of the treated paper. The decorative design is customarily printed on this overlay sheet and then assembled with the pre-formed article so that the design portion of the overlay is in direct contact with the surface of the pre-form. Thereafter, the assembly is molded under pressure and heat so as to convert the resinous component thereof to a cured condition.

The problem of printing is very much in fore when preparing decorative molded articles. Unlike in the preparation of the laminates, the printed design cannot be applied conveniently to any component of the assembly other than the impregnated overlay. Accordingly, the resinous impregnants of this invention greatly facilitate printing techniques. As indicated prevously, an overlay impregnated with the resinous compositions of this invention is much more receptive to clear printing than if the overlay is impregnated with the amino triazine resin solely.

In addition to improved printing qualities accomplished by the practice of this invention, another important advantage is realized in the production of decorative molded articles. This improvement is in the nature of improved gloss of the molded article as it leaves the mold. Ordinarily, filled molding compositions of the type herein concerned present no problem as regards to the reduced surface gloss when the article is discharged from a hot mold. This is so because the molding composition, although it may be densified, nevertheless is composed of individual particles of minute sizes. Therefore, a composition of fine particle sizes will result in acceptably glossy surfaces in spite of the fact that the molded article is discharged hot from the mold. If the mold is allowed to cool before removing the molded article, then it is comparatively immaterial in what state of fineness the molding compositions existed before molding. However, as the particle sizes making up the molding composition are increased, there is a tendency for the molded part to develop a dull surface when removed from a hot press. This dulling characteristic can be obviated by allowing the press to cool down before extracting the molded article, as is practiced in the production of decorative high pressure laminates. Such a procedure, however, is uneconomical and could not be practiced commercially to mass produce articles such as dinnerware.

Where an overlay is applied to a pre-formed article, one is confronted with a situation wherein the decorative surface effectively consists of a molding composition of large particle sizes. Consequently the effect of "hot pulling" or the obtaining of poor surface gloss is manifest in such molding operations. By using the resinous compositions of this invention to impregnate the decorative overlay, one may apply the overlay to pre-shaped articles and mold the composite in a conventional manner, discharge the molded article hot from the press, and at the same time obtain articles which exhibit excellent gloss characteristics.

The advantages of the instant invention can be realized by impregnating a decorative overlay with an amino triazine-formaldehyde resin containing a small amount of hydrolyzed polyvinyl acetate. The amount of hydrolyzed polyvinyl acetate that can be used varies over a rather narrow critical range. The range that we have found to be effective is from about 1%–5% of the hydrolyzed polyvinyl acetate based upont he solid amino triazine-formaldehyde condensate. We have found that the amount of the polyvinyl alcohol product more preferably ranges between 2%–4%, with the optimum amount appearing to be within the order of approximately 3%. If an amount of polyvinyl alcohol is used within the stated ranges, the improvement of gloss obtained in hot molding operations is outstanding and the printability of the overlay is markedly improved. Amounts of the polyvinyl alcohol greater than about 5% may be used in order to obtain molded articles having superior gloss, however, amounts of this material significantly higher than 5% tends to plasticize the thermosetting resinous material. We wish to avoid any plasticizing of the thermosetting resin component for various reasons which will be outlined hereinbelow.

The hydrolyzed polyvinyl acetate products suitable for use in the practice of this invention are the conventional hydrolysis products of polyvinyl acetate exhibiting a degree of hydrolysis as represented by hydroxyl content of from about 50% to as high as 95%. Of course polyvinyl alcohol, wherein the hydroxyl content is 100%, may be used, but such a product is difficult to obtain in commercial quantities. The hydroxyl content of the hydrolyzed polyvinyl acetate should be at least 50%. If the hydroxyl content is significantly less than 50% compatibility problems are encountered.

The term impregnation has been repeatedly mentioned hereinbefore. The use of this term has been in light of its accepted meaning in the molding art which contemplates treating or infusing the filler with a mobile resinous material. This is usually accomplished by employing a solution or syrup of the resin. By and large the amino resin molding compounds contemplated herein are water-soluble. Therefore, where the resin exhibits water solubility, we prefer to effect impregnation with an essentially aqueous syrup thereof. Although a resin may be completely soluble in water it is sometimes desirable, for reasons appreciated in the art, to employ a solvent system consisting of a major portion of water and a minor portion of a water-soluble alcohol. The advantages to be gained by the use of an alcohol are generally realized by amounts thereof not appreciably exceeding 25% based on the water in the solvent system. In a few instances the amino resin condensate may lack adequate water solubility characteristics. Benzoguanamine resins are typical of said condensates. Where this condition exists it becomes necessary to employ a solvent system consisting predominantly, if not entirely, of a water-soluble alcohol. It is to be appreciated from the foregoing that the presence of the polyvinyl alcohol in the compositions of this invention will not affect the mechanics or embodiments of the impregnation procedures conventionally observed.

We recognize that the use of polyvinyl alcohol products to modify thermosetting amino-formaldehyde condensates is old in the art. However, the prior art directed to the use of this material to modify amino resins is confined to those instances where plasticizing of the amino resin is desired. In order to effectively plasticize an amino triazine-formaldehyde condensate with polyvinyl alcohol, it is necessary to use amounts of said modifier significantly exceeding 5% and generally exceeding 10%. While certain advantages are gained by plasticizing an amino resin, each instance of effective plasticizing heretofore proposed results in detraction from the excellent chemical and abrasion-resistant properties of the amino resin. Polyvinyl alcohol products are no exceptions in this regard. Since this invention is concerned with the preparation of high quality decorative laminates and molded articles, the ultimate in wear characteristics associated with amino triazine-formaldehyde resinous products is desired. Consequently, it is not desired in the practice of this invention to plasticize the amino resin. If the amount of polyvinyl alcohol product is within the range specified hereinabove, that is, does not exceed about 5% based on the thermosetting resin employed, no significant plasticizing of the thermosetting resin will occur.

Another aspect of our instant discovery is that we have found that a melamine formaldehyde condensate can be admixed with the polyvinyl alcohol, hexamethylenetetramine and an acid curing catalyst to obtain a dry, stable, single package system. This system may be used by the molder or laminator by merely dissolving it in water or a water-soluble alcohol-water system, and may thus be employed to impregnate decorative overlays. In such single package systems, the proportions of amino resin to polyvinyl alcohol and the types of polyvinyl alcohol applicable correspond to those discussed hereinabove. The acid curing catalyst may be any carboxylic acid having a dissociation constant of at least $2.1 \times 10^{-4}$ and which is soluble in water to the extent necessary to effectively catalyze the thermosetting condensate employed. In addition, the acid material should be a solid material with a melting point of at least about 50° C. Suitable acid catalysts of this type include such as fumaric acid, maleic anhydride, oxalic acid, phthalic anhydride, tetrachlorophthalic anhydride and the like. The amount of the acid catalysts may range from about 0.02 to 5% based on the weight of the thermosetting resin component, and usually from about 0.1 to 1% is the preferred range. The amount of the hexamethylenetetramine ranges from about 0.1 to 1% based on the weight of the thermosetting resin.

The thermosetting amino resins which may be used in the practice of this invention are the reaction products of an aldehyde and an amino triazine amidogen.

The amino triazines are particularly exemplified by the compound melamine. However, illustrative of other types of triazine amidogens are the following: deamidation products of melamine, e.g., melam, melem, and melon, 2,4,6-tris(monoethylamino)-1,3,5-triazines, e.g., 2,4,6-tris(ethylamino)-1,3,5-triazines; 2,4,6-tris(arylamino)-1,3,5-triazines, e.g., 2,4,6-tris(phenylamino)-1,3,5-triazine; 2-chloro-4,6-diamino-1,3,5-triazine; 2-amino-4-hydroxyl-6-phenyl-1,3,5-triazine; ammeline; ammelide; a guanamine, e.g., benzoguanamine, formoguanamine, acetoguanamine, adipoguanamine, sebacoguanamine, diphenyl adipoguanamine, and the like.

While all of the triazine amidogens mentioned hereinabove condense with an aldehyde to give thermosetting condensates useful for the preparation of the decorative articles of this invention, melamine or benzoguanamine or combinations of a major amount of either melamine or benzoguanamine with a minor portion of any of the other triazines mentioned are preferred.

Additionally one may use other amidogens not having the triazine structure in combination with melamine or benzoguanamine to produce suitable condensates. Examples of such amidogens include urea, dicyandiamide and the like.

The amino triazines are preferred in preparing the condensates useful in this invention because of the transparency, high abrasion resistance, and excellent heat and chemical resistance of said condensates.

In preparing the water-soluble condensation products, the reaction between the aldehyde, specifically formaldehyde, and the amino triazine may be carried out at normal or at elevated temperatures, at atmospheric, sub-atmospheric, or super-atmospheric pressures, and under neutral, alkaline, or acid conditions. However, it is preferred that the polymerization and any dehydration be effected under pH conditions in the range of 6.5–9.5 at a temperature of from about 60°–105° C. The acid or alkaline material capable of supplying the necessary pH conditions includes a variety of salts, bases and acids well known in the resin art. The condensation reaction is preferably carried out in an aqueous medium.

Formaldehyde or compounds engenerating formaldehyde, such as paraformaldehyde, hexamethylenetetramine, and the like, comprise the preferred aldehyde component in the preparation of the thermosetting resins useful in this invention. Nevertheless, for certain applications it may be desirable to use aldehydes such as acetaldehyde, propionaldehyde, butyraldehyde, acrolein, benzaldehyde, furfural, etc., mixtures thereof, or mixtures of formaldehyde with one or more of the above-mentioned aldehydes.

In order that this present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as indicated in the appended claims.

*Example 1*

126 parts of melamine and 162 parts of 37% aqueous formaldehyde (formalin) were charged to a suitable reaction vessel equipped with an agitator and reflux condenser. The pH of the slurry was adjusted to 6.9–7.2 with ½ N sodium hydroxide. The slurry was then heated to reflux temperature (102° C.) in thirty minutes and held there for twenty minutes. The pH of the reaction system was then adjusted to about 10 using sodium hydroxide and the resulting clear solution was spray-dried by conventional methods.

To 100 parts of the above spray-dried melamine resin were added 3 parts of a hydrolyzed polyvinyl acetate containing about 88% polyvinyl alcohol, 0.32 part hexamethylenetetramine and 0.20 part phthalic anhydride. A dry blend of these ingredients was made by mixing in a ribbon mixer.

A resinous impregnating syrup was prepared by homogeneously mixing 100 parts of above-described catalyzed mixture, 123.5 parts of water and 6.5 parts of isopropyl alcohol. The resultant resinous syrup was clear and water white.

A substantially pure grade of alpha cellulose paper was impregnated with the resinous syrup. The resin impregnated paper was then dried under a battery of heat lamps. Solid resin pickup was in the order of 67–72%. In the drying operation, the heat lamps were so adjusted so as to give a dry impregnate containing about 6% moisture content. The dry impregnate was then printed with a vari-colored artistic design. The printing characteristics of the overlay treated in accordance with this example were found to be considerably superior to impregnated sheets wherein the resinous impregnant consisted solely of the melamine resin of this example.

A 1/16" decorative laminate was prepared by consolidating the printed overlay sheet described above, a barrier sheet of white paper impregnated with approximately 50% of the unmodified melamine-formaldehyde resin of this example, and a core made up of 6 sheets of sulfate kraft paper that had been impregnated with a heat reactive phenol-formaldehyde resin, dried, and partially cured. In this assembly the printed side of the overlay sheet was in direct contact with the barrier sheet. The plies were consolidated by heating 15 minutes at 150° C. under a pressure of 1100 p.s.i.

The appearance of the laminate prepared in accordance with this example was noticeably above standard quality. The clear, distinct decorative design observed was in a degree attributable to the lack of an interface between the print design and surface. Nevertheless, the clarity of the design per se was beneficially facilitated by the use of the melamine resin polyvinyl alcohol composition of this example for impregnating the overlay.

*Example 2*

A benzoguanamine-formaldehyde resin intermediate was prepared by reacting one mol of benzoguanamine and two mols of formaldehyde. Reaction was carried out in an aqueous medium at reflux point at an initially neutral pH value until precipitation first occurred; concentration and dehydration were then carried out under reduced pressure at 65° C. The dried resin was dissolved at a solids concentration of 60% in a solvent composed of 60 parts by weight of ethylene glycol monoethyl ether and 40 parts of ethanol.

A portion of this solution, 1668 parts, was mixed with 538 parts of chopped alpha cellulose and the mix dried at 70° C. in a tray dryer until the volatile content was reduced to 6%. To the dried unground was added 0.5% by weight of phthalic anhydride and 0.5% by weight of a mold lubricant consisting of zinc stearate. This mixture, along with 70 parts lithopone pigment, 0.02 part of permanent violet toner and 0.01 part of light chrome yellow, was charged to a ball mill and ground therein until uniform admixture of the various components was obtained. The ground material was then densified to a specific gravity of approximately 1.2 using a standard Colton single stroke preformer. The densified material was then granulated to size in a Stokes oscillator type granulator. The apparent density of the final granulated product was 0.6 as determined by ASTM test method D1182–54.

A sufficient quantity of the granulated molding composition was charged to a mold having a conventional dinner plate cavity design. The composition was pre-shaped by using an appropriate pressure so that while the composition was in the uncured state after pre-shaping it showed sufficient strength and rigidity to permit handling without damage or distortion.

An alpha cellulose decorative overlay was impregnated with the benzoguanamine resin solution described in the initial part of the example, which contained 2% of a polyvinyl alcohol based on the weight of the benzoguanamine resin. The polyvinyl alcohol employed contained 60% polyvinyl alcohol and 40% polyvinyl acetate. The impregnation conditions were so adjusted so as to result in a resin pickup (solid basis) of 65% based on the weight of the untreated overlay. The overlay was then dried under a battery of infra-red lamps until it possessed a volatile content of 4%. Next the treated overlay was printed with an artistic design. The printed overlay was then mounted upon the surface of the preform so that the printed design was in contact therewith. This assembly was then cured in a mold using curing conditions of 4 minutes at 155° C. at 1000 p.s.i. Following the curing cycle, the molded plate was discharged hot from the mold. The surface gloss of the test plate prepared as described was excellent. A control plate was made in an identical manner as employed to prepare the above described plate except that the overlay was impregnated with a solution of the benzoguanamine resin containing no polyvinyl alcohol. This control plate was also discharged from the mold in a hot condition. The control plate was perceptibly of a lower gloss than the plate prepared in accordance with this invention.

We claim:

1. A decorative overlay sheet, of from about 3–4 mils in thickness, which imparts a high gloss to the decorative surface of a heat- and pressure-consolidated thermoset article prepared therewith, which comprises a sheet of α-cellulose paper impregnated throughout with from about 60% to about 70% by weight, based on the total weight of the impregnated sheet, of a resinous composition comprising a soluble, thermosetting condensate of from about 1–3 mols of an aldehyde per mol of a compound selected from the group consisting of melamine and benzoguanamine and from about 1–5% by weight, based on the weight of said condensate, of a hydrolyzed product of polyvinyl acetate having a hydroxyl content of at least about 50%.

2. A decorative overlay sheet, of from about 3–4 mils in thickness, which imparts a high gloss to the decorative surface of a heat- and pressure-consolidated thermoset article prepared therewith, which comprises a sheet of α-cellulose paper impregnated throughout with from about 60% to about 70% by weight, based on the total weight of the impregnated sheet, of a resinous composition comprising a soluble, thermosetting condensate of from about 1–3 mols of formaldehyde per mol of a compound selected from the group consisting of melamine and benzoguanamine and from about 1–5% by weight, based on the weight of said condensate, of a hydrolyzed product of polyvinyl acetate having a hydroxyl content of at least about 50%.

3. A decorative overlay sheet, of from about 3–4 mils in thickness, which imparts a high gloss to the decorative surface of a heat- and pressure-consolidated thermoset article prepared therewith, which comprises a sheet of α-cellulose paper impregnated throughout with from about 60% to about 70% by weight, based on the total weight of the impregnated sheet, of a resinous composition comprising a soluble, thermosetting condensate of from about 1–3 mols of formaldehyde per mol of melamine and from about 1–5% by weight, based on the weight of said condensate, of a hydrolyzed product of polyvinyl acetate having a hydroxyl content of at least about 50%.

4. A decorative overlay sheet, of from about 3–4 mils in thickness, which imparts a high gloss to the decorative surface of a heat- and pressure-consolidated thermoset article prepared therewith, which comprises a sheet of α-cellulose paper impregnated throughout with from about 60% to about 70% by weight, based on the total weight of the impregnated sheet, of a resinous composition comprising a soluble, thermosetting condensate of from about 1–3 mols of formaldehyde per mol of benzoguanamine and from about 1–5% by weight, of a hydrolyzed product of polyvinyl acetate having a hydroxyl content of at least about 50%.

5. A decorative overlay sheet, of from about 3–4 mils in thickness, which imparts a high gloss to the decorative surface of a heat- and pressure-consolidated thermoset article prepared therewith, which comprises a sheet of α- cellulose paper impregnated throughout with from about 60% to about 70% by weight, based on the total weight of the impregnated sheet, of a resinous composition comprising a soluble, thermosetting condensate of from about 1.3–2 mols of formaldehyde per mol of melamine and from about 2–4% by weight, based on the weight of said condensate, of a hydrolyzed product of polyvinyl acetate having a hydroxyl content of at least about 80%.

6. A decorative overlay sheet, of from about 3–4 mils in thickness, which imparts a high gloss to the decorative surface of a heat- and pressure-consolidated thermoset article prepared therewith, which comprises a sheet of α-cellulose of paper impregnated throughout with from about 60% to about 70% by weight, based on the total weight of the impregnated sheet, of a resinous composition comprising a soluble, thermosetting condensate of from about 1.3–2 mols of formaldehyde per mol of benzoguanamine and from about 2–4% by weight, based on the weight of said condensate, of a hydrolyzed product of polyvinyl acetate having a hydroxyl content of at least about 80%.

7. A heat- and pressure-consolidated thermoset article, the decorative surface of which exhibits a high gloss, which comprises a decorative overlay sheet of from about 3–4 mils in thickness comprising α-cellulose paper impregnated throughout with from about 60% to about 70% by weight, based on the total weight of the impregnated sheet, of a thermoset resinous composition derived from a resinous composition comprising a soluble, thermosetting condensate of from about 1–3 mols of an aldehyde per mol of a compound selected from the group consisting of melamine and benzoguanamine and from about 1–5% by weight, based on the weight of said condensate, of a hydrolyzed product of polyvinyl acetate having a hydroxyl content of at least about 50%, said impregnated sheet being firmly secured to a reinforced base member comprising a thermoset aminotriazine-aldehyde resinous condensate.

8. A heat- and pressure-consolidated thermoset article, the decorative surface of which exhibits a high gloss, which comprises a decorative overlay sheet of from about 3–4 mils in thickness comprising α-cellulose paper impregnated throughout with from about 60% to about 70% by weight, based on the total weight of the impregnated sheet, of a thermoset resinous composition derived from a resinous composition comprising a soluble, thermosetting condensate of from about 1–3 mols of formaldehyde per mol of a compound selected from the group consisting of melamine and benzoguanamine and from about 1–5% by weight, based on the weight of said condensate, of a hydrolyzed product of polyvinyl acetate having a hydroxyl content of at least about 50%, said impregnated sheet being firmly secured to a reinforced base member comprising a thermoset aminotriazine-aldehyde resinous condensate.

9. A heat- and pressure-consolidated thermoset article, the decorative surface of which exhibits a high gloss, which comprises a decorative overlay sheet of from about 3–4 mils in thickness comprising α-cellulose paper impregnated throughout with from about 60% to about 70% by weight, based on the total weight of the impregnated sheet, of a thermoset resinous composition derived from a resinous composition comprising a soluble, thermosetting condensate of from about 1–3 mols of formaldehyde per mol of melamine and from about 1–5% by weight, based on the weight of said condensate, of a hydrolyzed product of polyvinyl acetate having a hydroxyl content of at least about 50%, said impregnated sheet being firmly secured to a reinforced base member comprising a thermoset aminotriazine-aldehyde resinous condensate.

10. A heat- and pressure-consolidated thermoset article, the decorative surface of which exhibits a high gloss, which comprises a decorative overlay sheet of from about 3–4 mils in thickness comprising α-cellulose paper impregnated throughout with from about 60% to about 70% by weight, based on the total weight of the impregnated sheet, of a thermoset resinous composition derived from a resinous composition comprising a soluble, thermosetting condensate of from about 1–3 mols of formaldehyde per mol of benzoguanamine and from about 1–5% by weight, based on the weight of said condensate, of a hydrolyzed product of polyvinyl acetate having a hydroxyl content of at least about 50%, said impregnated sheet being firmly secured to a reinforced base member comprising a thermoset aminotriazine-aldehyde resinous condensate.

11. A heat- and pressure-consolidated thermoset article, the decorative surface of which exhibits a high gloss, which comprises a decorative overlay sheet of from about 3–4 mils in thickness comprising α-cellulose paper impregnated throughout with from about 60% to about 70% by weight, based on the total weight of the impregnated sheet, of a thermoset resinous composition derived from a resinous composition comprising a soluble, thermosetting condensate of from about 1.3–2 mols of formaldehyde per mol of melamine and from about 2–4% by weight, based on the weight of said condensate, of a hydrolyzed product of polyvinyl acetate having a hydroxyl content of at least about 80%, said impregnated sheet being firmly secured to a reinforced base member comprising a thermoset aminotriazine-aldehyde resinous condensate.

12. A heat- and pressure-consolidated thermoset article, the decorative surface of which exhibits a high gloss, which comprises a decorative overlay sheet of from about 3–4 mils in thickness comprising α-cellulose paper impregnated throughout with from about 60% to about 70% by weight, based on the total weight of the impregnated sheet, of a thermoset resinous composition derived from a resinous composition comprising a soluble, thermosetting condensate of from about 1.3–2 mols of formaldehyde per mol of benzoguanamine and from about 2–4% by weight, based on the weight of said condensate, of a hydrolyzed product of a polyvinyl acetate having a hydroxyl content of at least about 80%, said impregnated sheet being firmly secured to a reinforced base member comprising a thermoset aminotriazine-aldehyde resinous condensate.

13. A process for preparing a molded article, the decorative surface of which exhibits a high gloss, which comprises the steps of (1) shaping a resinous composition comprising a fibrous filler impregnated with a thermosetting aminotriazine-aldehyde condensate into a thermosetting pre-formed article, (2) applying to said pre-formed article a decorative overlay sheet of from about 3–4 mils in thickness comprising α-cellulose paper impregnated throughout with from about 60% to about 70% by weight, based on the total weight of the impregnated sheet, of a resinous composition comprising a soluble, thermosetting condensate of from about 1–3 mols of an aldehyde per mol of a compound selected from the group consisting of melamine and benzoguanamine and from about 1–5% by weight, based on the weight of said condensate, of a hydrolyzed product of polyvinyl acetate having a hydroxyl content of at least about 50% and, thereafter, (3) applying sufficient heat and pressure to the resulting composite article to produce a thermoset, molded article.

14. A process for preparing a molded article, the decorative surface of which exhibits a high gloss, which comprises the steps of (1) shaping a resinous composition comprising a fibrous filler impregnated with a thermosetting aminotriazine-aldehyde condensate into a thermosetting pre-formed article, (2) applying to said pre-formed article a decorative overlay sheet of from about 3–4 mils in thickness comprising α-cellulose paper impregnated throughout with from about 60% to about 70% by weight, based on the total weight of the impregnated sheet, of a resinous composition comprising a soluble, thermosetting condensate of from about 1.3–2 mols of formaldehyde per mol of melamine and from about 2–4% by weight, based on the weight of said condensate, of a hydrolyzed product of polyvinyl acetate having a hydroxyl content of at least about 80% and, thereafter, (3) applying sufficient heat and pressure to the resulting composite article to produce a thermoset, molded article.

15. A process for preparing a molded article, the decorative surface of which exhibits a high gloss, which comprises the steps of (1) shaping a resinous composition comprising a fibrous filler impregnated with a thermosetting aminotriazine-aldehyde condensate into a thermosetting pre-formed article, (2) applying to said pre-formed article a decorative overlay sheet of from about 3–4 mils in thickness comprising α-cellulose paper impregnated throughout with from about 60% to about 70% by weight, based on the total weight of the impregnated sheet, of a resinous composition comprising a soluble, thermosetting condensate of from about 1.3–2 mols of formaldehyde per mol of benzoguanamine and from about 2–4% by weight, based on the weight of said condensate, of a hydrolyzed product of polyvinyl acetate having a hydroxyl content of at least about 80% and, thereafter, (3) applying sufficient heat and pressure to the resulting composite article to produce a thermoset, molded article.

References Cited in the file of this patent

UNITED STATES PATENTS

| | | |
|---|---|---|
| 2,368,451 | Alelio | Jan. 30, 1945 |
| 2,448,638 | Murray et al. | Sept. 7, 1948 |

FOREIGN PATENTS

| | | |
|---|---|---|
| 596,973 | Great Britain | Jan. 15, 1948 |
| 693,051 | Great Britain | June 24, 1953 |

OTHER REFERENCES

"Laminating With Melamine Resins," by Noble; Plastics, December 1946, pp. 46, 48, 49, and 95.